United States Patent [19]

Mork et al.

[11] Patent Number: 5,241,638
[45] Date of Patent: Aug. 31, 1993

[54] DUAL CACHE MEMORY

[75] Inventors: Jay E. Mork; Kerry E. Ober, both of Eagan; Derald A. Pedersen, Burnsville, all of Minn.

[73] Assignee: Ceridian Corporation, Minneapolis, Minn.

[21] Appl. No.: 764,685

[22] Filed: Aug. 12, 1985

[51] Int. Cl.⁵ .............................................. G06F 13/00
[52] U.S. Cl. .................................................... 395/400
[58] Field of Search ................. 395/400; 364/200, 900

[56] References Cited

U.S. PATENT DOCUMENTS

| | | | |
|---|---|---|---|
| 3,866,183 | 2/1975 | Lange | 364/200 |
| 3,896,419 | 7/1975 | Lange et al. | 364/200 |
| 3,979,726 | 9/1976 | Lange et al. | 364/200 |
| 4,413,317 | 11/1983 | Swenson | 364/200 |
| 4,425,615 | 1/1984 | Swenson et al. | 364/200 |
| 4,471,429 | 9/1984 | Porter et al. | 364/200 |
| 4,471,430 | 9/1984 | Bowden et al. | 364/200 |
| 4,525,777 | 6/1985 | Webster et al. | 364/200 |

Primary Examiner—Salvatore Cangialosi
Attorney, Agent, or Firm—Kinney & Lange

[57] ABSTRACT

A dual cache memory system employs a search cache addressed by virtual addresses, the search cache containing a plurality of recently used, pre-translated physical addresses. A map cache contains virtual address bound data and relocation data to map the virtual address space to physical address space. Upon receipt of a virtual address, a search of the search cache is first conducted to retrieve the associated physical address if it has been already translated. If not, a binary search of the memory map using the map cache is conducted to find that map entry whose virtual address bound identifies the region of virtual addresses containing the virtual address being mapped. The physical address is constructed from the retrieved relocation data and virtual address, and is written into the search cache for future use.

55 Claims, 3 Drawing Sheets

DUAL CACHE MEMORY

The United States Government has rights in this invention pursuant to Contract (or Grant) No. F30602-82-C-0175 awarded by the United States Air Force.

This invention relates to addressing techniques for a computer, and particularly to addressing techniques utilizing search and map cache techniques.

In computer systems utilizing large memories, it is common to employ addressing techniques whereby a virtual address is utilized to locate physical addresses in the memory by association. However, if the absolute address cannot be readily determined, laborious memory searches are required, often requiring a significant amount of time. It is, therefore, desirable to address the memory in such a way that memory searches can be limited. The present invention concerns apparatus for obtaining physical memory addresses from virtual memory addresses.

In accordance with the present invention, two cache apparatus are used. The first cache is a associative memory addressed by a virtual memory address. The first cache holds data concerning a plurality of recently used, pre-translated physical memory addresses. The second cache is a map cache holding copies of the data in some memory addresses. The data in the second cache defines the map of the main memory. When a virtual address is presented to the apparatus, the first cache is inspected to determine if the address has already been translated. If it has, the desired physical address data is accessed from the first cache and combined with a portion of the virtual address to derive the physical address. If, however, the address has not been translated, a binary search through an ordered list of map entries is performed using the second cache. Each map entry contains a virtual address bound and a relocation amount. The virtual address is compared to the virtual address bounds to locate a desired map entry. The retrieved relocation amount is added to a portion of the virtual address to derive the physical address. The second cache contains map entries used in prior searches. If the map entry needed to translate a virtual address is not in the map cache, a search through main memory is performed. During this search, the data in the second cache is augmented. When the map entry needed to translate the desired memory address is found, either in the second cache or in the main memory, the address translation is completed. A memory access is then initiated, and the first cache is updated.

One feature of the present invention is the provision of means to detect the validity of the map cache entries, and if invalid for a given routine, a new ordered list of map entries is loaded into the second cache from main memory.

Another feature of the present invention is the provision of means for entering physical address data from the map cache search into the first cache so that the first cache contains pre-translated physical address data of the most recently used addresses.

Another feature of the present invention resides in the provision of the dual cache search technique to significantly reduce memory searching, particularly for large maps.

The above and other features of this invention will be more fully understood from the following detailed description and the drawings, in which.

Figure 1:
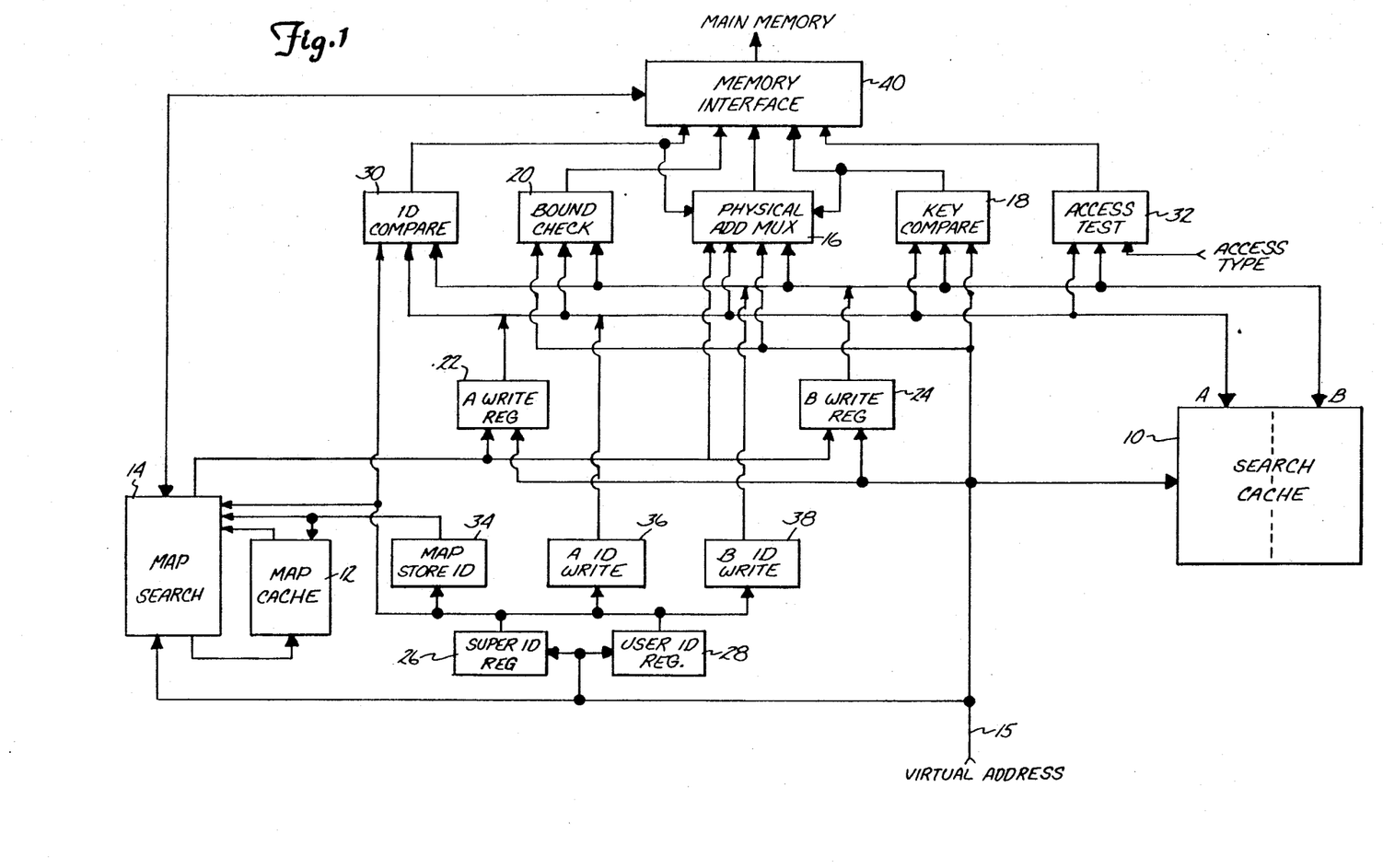
FIG. 1 is a block diagram of the addressing apparatus according to the presently preferred embodiment of the present invention.

With reference to the drawings, and particularly FIG. 1, there a memory address system in accordance with the presently preferred embodiment of the present invention. The system includes a search cache 10 and a map cache 12. The virtual address is presented at input 15. Portions of the virtual address are presented to search cache 10, map search 14, physical address multiplexer 16, key compare 18, and bound check 20. In addition, portions of the virtual address are presented to A and B write registers 22 and 24, as well as to supervisor ID register 26 and user ID register 28. Search cache 10 has A and B input/outputs which each provide input to multiplexer 16, key compare 18, bound check 20, identification compare 30 and access test 32. Map search 14 also provides an output to A and B write registers 22 and 24, as well as to physical address multiplexer 16. A and B write registers 22 and 24 provide outputs to the bus for input to the A and B sides of search cache 10, respectively. ID registers 26 and 28 provide outputs to identification compare 30, map store ID 34, and A and B ID write registers 36 and 38. A and B ID write registers 36 and 38 provide outputs to the A and B buses for input to the A and B sides of search cache 10. The outputs of ID registers 26 and 28 are also provided as inputs to map search 14, and an output of map store ID 34 is provided as an input to both map cache 12 and map search 14. Map cache 12 and map search 14 are interconnected, and map search 14 is connected to exchange data with memory interface 40. Memory interface 40 provides communication between the addressing apparatus illustrated in FIG. 1 and the main memory (not shown). Multiplexer 16, key compare 18, bound check 20, identification compare 30 and access test 32 provide outputs to memory interface 40. Also, outputs from identification compare 30 and key compare 18 are provided to physical address multiplexer 16.

Figure 2:
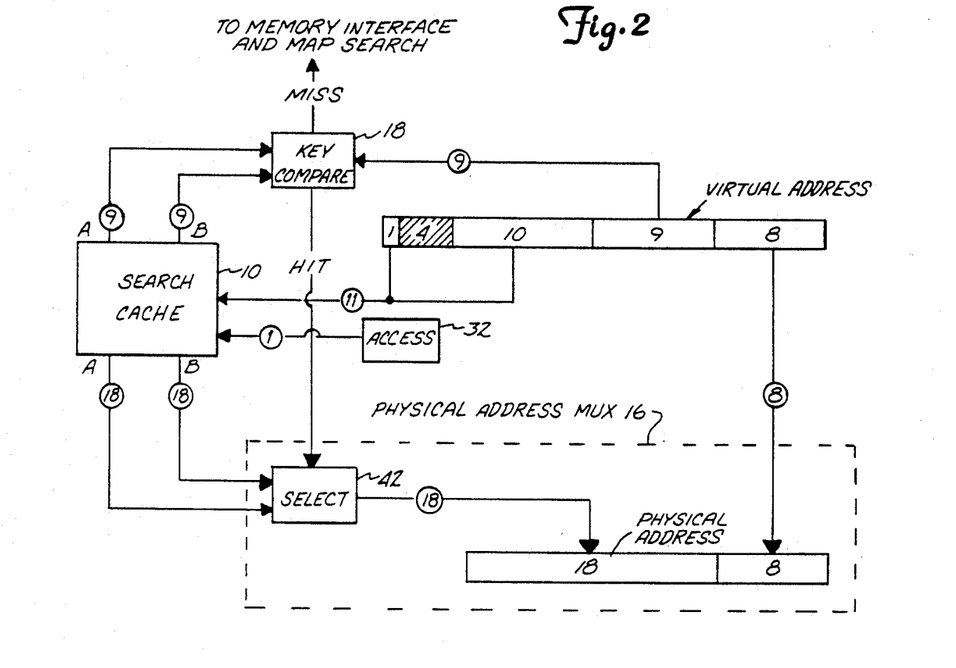
FIG. 2 is a simplified block diagram of the addressing apparatus useful in describing the principles of operation of the search cache illustrated in FIG. 1.

With reference particularly to FIG. 2, the operation of the search cache 10 may be explained. The virtual address presented at input 15 is a 32 bit word. Bits 2-5 are not being used, bits 1 and 6-15 are an 11 bit address used with search cache 10, bits 16-24 are an associative search key code and bits 25-32 form the 8 least significant bits of the physical address. The 11 address bits of the virtual address are presented to search cache 10, while the 9 bit associative search key code is provided to key compare 18 and the 8 bits forming the 8 least significant bits of the physical address are provided to physical address multiplexer 16. A one-bit access code, indicating operand or instruction access, is provided to search cache 10 from access test 32. Using the 11 bit associative address and the one-bit access code, the search cache accesses a word containing two cache entries, one on side A of the cache and the other on side B. Each cache entry is 41 bits wide, thus a word in search cache 10 comprises 82 bits. Eighteen bits of each entry comprise the physical address base, which, when concatenated with the 8 bits of the virtual address, will form a physical address. Nine bits of each entry comprise an associative search key code, to be compared with the key code of the virtual address. The remaining 14 bits of each entry are used for protection, privilege, identification and control purposes, to be explained. The 9 bits comprising a key for each of the A and B entries of the cache are provided to key compare 18 and the 18 bits of address for each entry are provided to physical address multiplexer 16. The 9 bit key from the virtual address is compared to both 9 bit key codes from the search cache by key compare 18. If a match is detected, key compare 18 provides a signal to physical address multiplexer 16 indicating a match. If no match occurs, a map search is initiated (to be explained).

Assuming a match is detected by key compare 18, physical address multiplexer 16 assembles the physical address. Particularly, physical address multiplexer 16 will select one of the A and B address bases from search cache 10, (depending upon which key from the search cache matched the key in the virtual address), and provide the address base, together with the 8 bits from the virtual address, to the memory interface for access to main memory. Thus, as illustrated in FIG. 2, physical address multiplexer 16 is a select mechanism 42 which selects either the A or B address base from the search cache and provides the same for incorporation in the physical address.

The description of the apparatus and its operation to this point has assumed the sought-for address base is found in search cache 10. However, if the physical address cannot be constructed from search cache entries, a search of the memory map is performed.

A memory map is an ordered list of map entries stored in main memory. A map entry contains a virtual address bound and a corresponding relocation amount. A virtual address bound is a virtual address which bounds a group (herein called a segment) of consecutive virtual addresses. A relocation amount is data which, when added to a portion of the virtual address, will form the physical address. The map search process of the present invention searches for that virtual address bound equal to or next higher to the virtual address being mapped (i.e., the smallest virtual address bound which is greater than or equal to the virtual address being mapped.) The relocation amount associated with the located virtual address bound is added to a portion of the virtual address to recover the physical address. By using an analogy to a city address, assume the addresses on Oak Street are consecutive, but the numbering system breaks at each cross street so each block in Oak Street contains a unique 100's address. The map of Oak Street does not show every address, only the highest address in each block. If one wishes to find 17321 Oak Street, and 17375 is the highest entry for the block, the map search will locate 17375, the associated relocation amount is determined to be 17300 and the address is found by adding 21 from the actual address to 17300 of the relocation amount. Thus, the virtual address space of the present invention can be thought of as being divided into segments, not necessarily of equal size, where the physical addresses associated with each segment bear the same relocation amount. Knowing the virtual address bound of the given segment and a relocation amount of the entire segment, the physical addresses for the entire segment can be determined from the virtual addresses. The physical address is equal to the relocation amount plus a portion of the virtual address. Thus, with reference to FIG. 3, the virtual address space can be thought of as containing a plurality of segments 44, each bounded at the end thereof by a virtual address bound 46. Each map entry contains the virtual address bound of a segment of the virtual address space and, the relocation amount of the segment. The map entry is a 64-bit word containing a 24-bit virtual address bound, a 24-bit relocation amount and two 8-bit segments to be explained.

Assuming key compare 18 indicated that search cache 10 does not contain the desired address, a signal is sent to map search 14 to initiate a search of map entries. Initially, using the same 11 address bits of the virtual address, map search 14 examines map cache 12 which contains copies of some or all of the map entries. The map search is binary in nature, meaning that the virtual address to be mapped is compared to the virtual address bound of the map entry at the center of the memory map. A determination is made as to whether the virtual address to be mapped is greater or smaller than the virtual address bound of the middle segment in the virtual address space. If the address to be mapped is greater, for example, that address is then compared with the virtual address bound of the map entry at the three-quarter point of the memory map. This process reduces the size of the memory map to be searched by a factor of 2 with each compare operation. The search and compare process continues until the virtual address being mapped is greater than the virtual address bound of one specific map entry in the map and is smaller than or equal to the virtual address bound of the next greater map entry.

Figure 4:
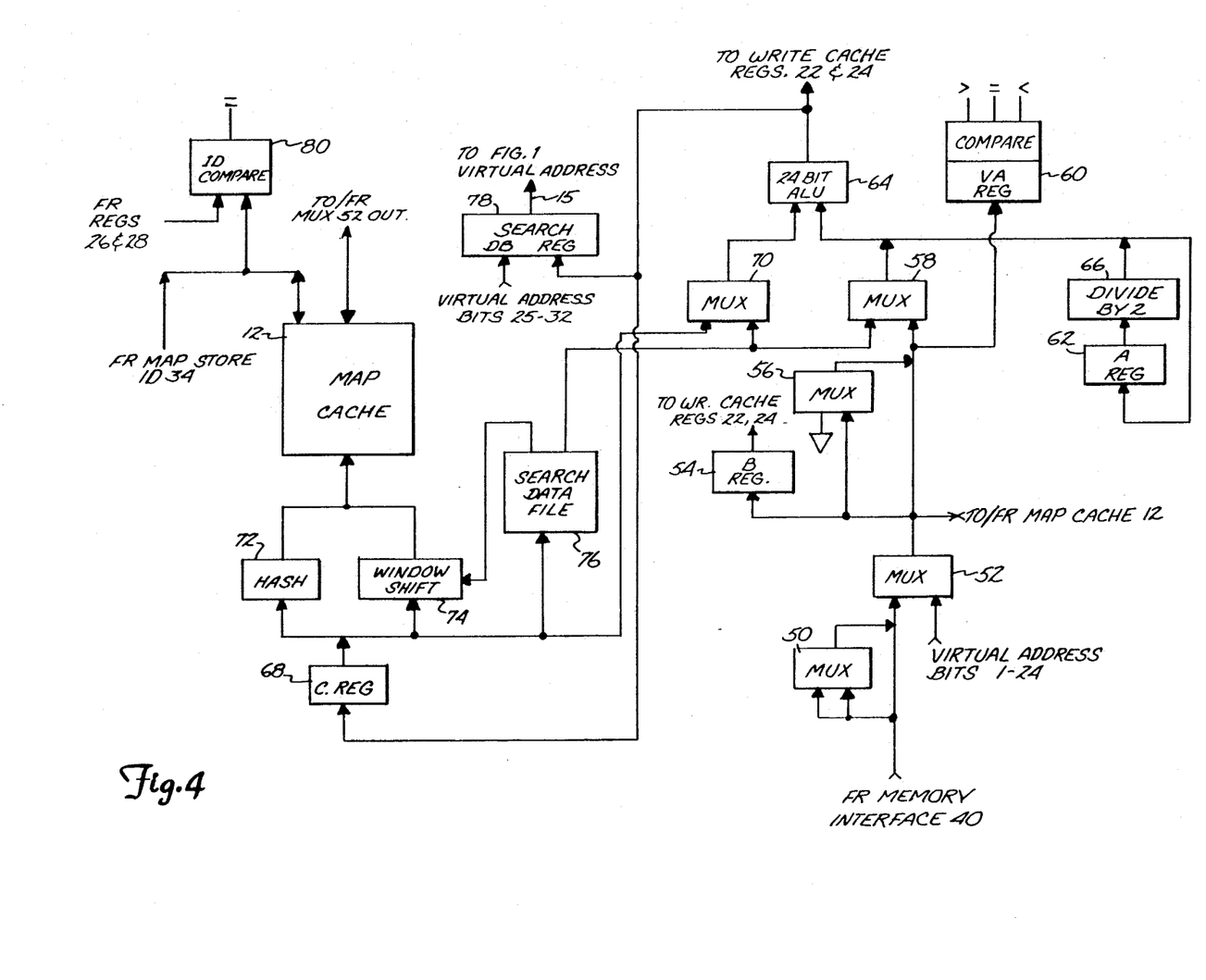
FIG. 4 is a block diagram of the map cache and map search apparatus illustrated in FIG. 1.

Referring to FIG. 4, the output from memory interface 40 is provided to both multiplexer 50 and multiplexer 52. The output of multiplexer 50 is provided to multiplexer 52 which also receives bits 1 through 24 of the virtual address from input 15. Output of multiplexer 52 is provided to B register 54, multiplexer 56, multiplexer 58 and virtual address register 60. Data from the map cache 12 is also provided to register 54, multiplexer 56, multiplexer 58, register 60, and ID compare 80. B register 54 provides outputs to write cache registers 22 and 24. Multiplexer 58 provides outputs to A register 62 and to ALU 64 for output to write cache registers 22 and 24. Register 62 provides an output to divide-by-2 circuit 66 for dividing the contents of the register 62 by 2 and returning the result to register 62 and to ALU 64. The output from ALU 64 is also provided to C register 68 which in turn provides an output to multiplexer 70 for input to ALU 64. Register 68 also provides outputs to hash function 72 and window shift 74 as well as to search data file 76. File 76 provides outputs to multiplexers 58 and 70 as well as to window shift 74. Hash function 72 and window shift 74 provide address inputs to map cache 12. Map cache 12 receives data input from multiplexer 52 and map store 34 (FIG. 1). Register 78 receives the output from ALU 64 as well as bits 25 and 32 of the virtual address. The output of register 78 is connected (through latches) to input 15. ID compares 80 receives inputs from map cache 12 and supervisor and user ID registers 26 and 28.

Search data file 76 contains data that controls the memory map search algorithm. The data comprises a copy of the virtual address being searched for, the value of the maximum entry number for the user and supervisor memory maps (to be explained), and the search size for each map. The various registers and multiplexers shown on the right of FIG. 4 are used to search through the memory and find that segment that contains the virtual address to be translated.

Figure 3:
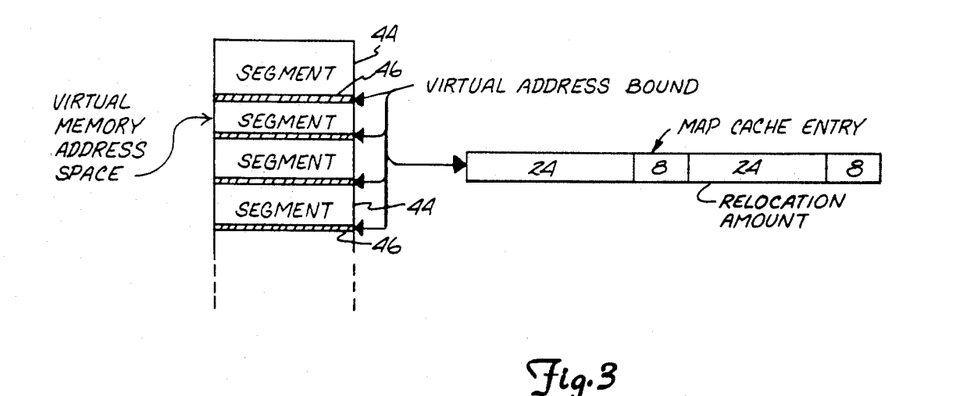
FIG. 3 is a diagram useful in explaining how a map entry partitions the virtual address space.

The virtual address is placed in the virtual address register 60 and is compared to the virtual address bound read from the map cache (see FIG. 3). Register 68 holds the offset from the map pointer of the memory map entry currently being examined. Register 54 holds the protection and privilege bits (to be explained) of the new entry for the search cache 10. Register 62 holds twice the difference between the current map entry and the next map entry to be inspected. The value is divided by two before it is used in computations. Multiplexer 56 masks the privilege bits off the map entry when it is being compared to the virtual address, and multiplexer 50 rearranges the data to be written in the map cache 12. Map cache 12 is addressed in either of two ways—by the hash code select 72 or the window shift function 74. Hash code select performs one of three hash functions on the contents of register 68 (to compress the 24-bit contents of the register down to 12 bits). The window shift function provided by shift 74 is used by the binary search algorithm. It selects one of four 10-bit sections of the 24-bit register 68. Output of register 68 is 10 bits of the map cache address. The search size for a map controls the window shift.

The function of the memory address mechanism of the present invention is to provide fast translation of virtual memory addresses to physical memory addresses and fast memory access checks. After the machine has run through several memory access cycles, the search cache 10 will contain valid entries and a typical map/check operation will work essentially as follows.

A 32-bit virtual memory address is presented to the apparatus. Eleven bits of the virtual address are used as an associative address to the search cache 10. Two relocated physical address bases at the selected cache location are read. The two map identification fields are compared to the contents of the supervisor or user map ID register. The two 9-bit key fields are compared to the 9-bit key of the virtual address The privilege and protection fields are compared to the access command to determine if the requested access is permitted. If the map identification field matches the current map number and the key field of the virtual address matches one of the key fields in the line of the cache, a cache "hit" has occurred. The physical address from the cache entry is concatenated to the eight virtual address bits to form the 26-bit physical address. Assuming the memory access is determined to be permitted, it may be initiated in one machine cycle. If the access is not determined to be permitted, the access is aborted and a error condition is generated in the software.

If neither cache entry is valid, for example if both map identifications are in error and/or neither key field matches the address, a cache "miss" has occurred. At this point a search through the memory map must be performed. The goal of the search is to find, as quickly as possible, the segment described in the memory map that contains the virtual address that needs to be translated and/or checked for access. Once the segment is found, the relocation amount and protection/privilege bits are available to be used. The search algorithm used is a binary search through the ordered list of map entries. The binary search starts with the virtual address bound of the map entry located in the middle of the memory map (one-half the maximum entry number held in file 76). The virtual address is compared to the virtual address bound and if the virtual address is greater than the bound, the sought for segment descriptor is in the second half of the map. On the other hand if the virtual address is less than the bound, the segment descriptor will be in the first half of the map. The select and compare procedure is performed again using the appropriate half of the map and the search continues to check the map in the middle of the unknown region until the desired map entry is found. A virtual address is "found" in the map when it is less than or equal to the virtual address bound of the current map entry and greater than the virtual address bound of the preceding map entry.

When a search cache miss occurs, the virtual address that was presented to the map cache is placed in virtual address register 60. The search size for the map is copied from the search file 76 to register 62. The search size is defined as the smallest power of 2 which is greater than the number of entries in the map. The search value in register 68 is the pointer to the middle segment descriptor in the list of segment descriptors to be searched because each segment descriptor uses two memory locations. For example, if there are 10 entries in the memory map, the search size (and hence length of the list to be searched) will be 16. The value loaded in register 68 will be 14. The fourteenth location in the list of segment descriptors will be the virtual address bound for the seventh segment which is in the middle of the (expanded) list of segment descriptors. Assuming map cache 12 contains currently valid entries, it will contain the map entry for the middle segment descriptor. The virtual address bound for this descriptor is read from the file and compared to the virtual address in register 60. If the virtual address is equal to the virtual address bound, the search is completed. If the virtual address is greater than the virtual address bound, the desired segment descriptor is in the upper half of the list of descriptors. If the virtual address is less than the virtual address bound, the desired segment descriptor in the lower half of the list of descriptors. Based on the compare, the value in register 60, divided by two, is either added to register 68 (if the virtual address is greater than the virtual address bound) or subtracted from the contents of register 68 (if the virtual address is less than the virtual address bound or if the maximum entry number has been exceeded). (The maximum entry number is the maximum number of entries in the map—10 in the example given.) This new value is placed in register 68. Note that register 68 now contains a pointer to the middle of the desired half of the list of segment descriptors because the value of the register 62 is divided by two. Continuing with the example started earlier, if the virtual address is less than the virtual address bound, the contents of register 62 (16) would be divided by two and subtracted from the contents of register 68 (14). The new value in register 68 would be 6. The sixth location in the list of segment descriptors is the virtual address bound of segment 3. Segment 3 is halfway between segment 0 and segment 7. The process begins again using the new values in registers 60 and 68. Note that the structure of the binary search causes the same map entries to be used over and over again. Therefore, all the map searches will use the middle entry, half of the searches will use the one quarter entry and the other half will use three quarter entry, etc. Thus, map cache 12 speeds searching significantly.

Each time a virtual address bound is read from map cache 12, it is checked for validity. Map identification data is stored in supervisor and user identification registers 26 and 28. If the map identification field of a map cache entry does not match the current map identification data in the appropriate ID register, the cache entry is invalid. If the map entry is not valid, a new map entry is fetched from main memory. The offset in register 68 is added to the map pointer value from search data file 76 to address the main memory via interface 40. The new map is written into map cache 12 along with the valid map ID and the compare/search process resumes.

The compare/search process continues until the value in register 62 is 2 or a virtual address equals a virtual address bound. If the latter condition occurs, the search is halted and the value in register 68 points to the correct segment descriptor. However if the search stops because the value in register 62 becomes 2, one additional test must be made. The virtual address bound is read from map cache 12 and compared to the virtual address. If the virtual address is less than the virtual address bound, the segment descriptor pointed to be register 68 is the desired descriptor. If the virtual address is greater than the virtual address bound, the segment descriptor pointed to be the contents of register 68 plus 1 is the desired segment descriptor.

Once the correct segment descriptor has been found, the virtual address is translated and a new entry is built for search cache 10. This new entry is loaded into one of write registers 22 and 24 and is written into search cache 10. The virtual address is presented once again to the search cache 10, and the access is initiated in one additional cycle.

The map cache entry and search cache entries contain fields comprising map identification data. As explained above, this map identification data is stored in the supervisor and user identification registers 26 and 28 to compare to the map identification field of the map cache entries. There are two memory maps active at any time—one for the supervisor and one for the user. Whenever a map is changed, the value in the supervisor or user identification register 26 or 28, is incremented by one. This invalidates the entries of search cache 10 and map cache 12 because the map identification field of each cache entry is determined by identification compare 30 or 80 to be unequal. When writing physical address data into search cache 10, identification compare 30 examines the map identification field of each entry to determine if the map identification field is invalid for either the A or B entry. If one side but not the other contains an invalid entry, the side with the invalid entry is written over with a new entry. If both entries are valid or invalid, registers 36 and 38 cause writing to be alternated between the A and B sides.

The search cache entry contains a privilege bit which is examined and compared to the access test bit to determine if access to the entry is permitted. Thus, even if the address is valid, access to the address, and entry to the main memory, are allowed only if permitted by the privilege data. Likewise, a protect bit may protect data from being otherwise overwritten.

One feature of the invention resides in the operation of bound check 20. Assume a virtual address arrives that is so close to a virtual address bound that access to the data requires relocation information from two different segments. When a search cache entry is created, if the entry is close to a segment boundary as to cross that boundary a bound check bit is set in the entry. After a map cache search has successfully located the map entry identifying a sought-for virtual address bound, the segment bound check bit is examined, and if it is set and the access size is adequately large, a second map cache search is initiated to find the relocation amount for the second segment.

The present invention thus provides a dual cache memory system which quickly and effectively locates physical addresses of a main memory.

This invention is not to be limited by the embodiment shown in the drawings and described in the description, which is given by way of example and not of limitation, but only in accordance with the scope of the appended claims.

What is claimed is:

1. Apparatus for creating a physical address of a location in a main memory of a computer corresponding to a virtual address, comprising input means for receiving said virtual address, search cache means containing a plurality of locations each containing data concerning a physical address; map cache means containing a plurality of map entries each containing virtual address bound data, said virtual address bound data bounding segments of virtual addresses associated with physical addresses in said main memory; first logic means for retrieving physical address data from the location of said search cache means specified by said virtual address; second logic means for searching said map cache means and retrieving segment data bounding said virtual address; said first logic means creating said physical address from physical address data retrieved from said search cache means and from said virtual address if physical address data matching said virtual address is retrieved from said search cache means, said first logic means initiating operation of said second logic means to retrieve segment data from said map cache means if physical address data matching said virtual address is not retrieved from said search cache means.

2. Apparatus according to claim 1 wherein said second logic means includes means for creating said physical address from said map cache means and said virtual address if the retrieved segment data corresponds to said virtual address.

3. Apparatus according to claim 1 wherein said first logic means includes first compare means for comparing said virtual address to the physical address data at each of said locations in said search cache means, and select means for selecting the physical address data corresponding to said virtual address.

4. Apparatus according to claim 3 wherein said first logic means further includes means for concatenating a portion of said virtual address with said selected physical address data to form said physical address.

5. Apparatus according to claim 3 wherein said second logic means comprises map entry select means for selecting a map entry from said map cache means, second compare means for comparing the virtual address bound data of the selected map entry with the virtual address at said input means, said select means being responsive to said second compare means detecting a non-correspondence to select another map entry.

6. Apparatus according to claim 5 wherein said select means includes file means containing information concerning the size of the map formed by the map entries, first pointer means for identifying the map entry to have its virtual address bound data compared by said second compare means, second pointer means responsive to said file means and said first pointer means for identifying a region of the map bounded by map entries previously identified by said first pointer means or by a maximum map entry, said region embracing virtual addresses including the virtual address at said input means, said first pointer means being responsive to said second pointer means and said second compare means to identify another map entry at the center of said region to further divide the region upon said second compare means detecting a non-correspondence.

7. Apparatus according to claim 6 wherein said map cache means further contains relocation data corresponding to a physical address associated with the corresponding virtual address, said apparatus further including third logic means responsive to said select means identifying a map entry associated with a region not capable of further division for adding the relocation data of said identified map entry with a portion of said virtual address to retrieve said physical address.

8. Apparatus according to claim 7 wherein said third logic means is further responsive to said second compare means detecting a correspondence between the virtual address at said input means and the virtual address bound data of a selected map entry for adding the relocation data of said selected map entry with a portion of the virtual address at said input means to retrieve said physical address.

9. Apparatus according to claim 7 further including write means responsive to said second logic means for writing into said search cache means physical address data corresponding to the physical address created by said second logic means.

10. Apparatus according to claim 7 further including second write means for writing map entries into said map cache means.

11. Apparatus according to claim 5 further including third logic means responsive to said select means identifying a map entry associated with a region not capable of further division for adding the relocation data of said identified map entry with a portion of said virtual address to retrieve said physical address.

12. Apparatus according to claim 1 wherein said search cache means contains a plurality of lines of physical address data, each line containing data concerning a plurality of physical addresses, said first logic means including first select means responsive to a first portion of said virtual address for selecting a line of physical address data, first compare means for comparing a second portion of said virtual address to a code associated with data for each physical address in said selected line to either identify the data for the individual physical address associated with the code which corresponds with said second portion of said virtual address or identify that no such correspondence exists, second select means responsive to said first compare means for selecting the data associated with the identified physical address data, and means connected to said second select means and said input means for concatenating a third portion of said virtual address with the physical address data selected by said second select means.

13. Apparatus according to claim 12 further including means connecting said second logic means to said first compare means for initiating operation of said second logic means when said first compare means identifies that said second portion of said virtual address does not correspond to any of said codes.

14. Apparatus according to claim 13 wherein said second logic means includes means for creating said physical address from said map cache means and said virtual address if the retrieved segment data corresponds to said virtual address.

15. Apparatus according to claim 14 further including write means responsive to said second logic means for writing into said search cache means physical address data corresponding to the physical address retrieved by said second logic means.

16. Apparatus according to claim 13 wherein said second logic means comprises map entry select means for selecting a map entry from said map cache means, second compare means for comparing the virtual address bound data of the selected map entry with the virtual address at said input means, said select means being responsive to said second compare means detecting a non-correspondence to select another map entry.

17. Apparatus according to claim 16 wherein said select means includes file means containing information concerning the size of the map formed by the map entries, first pointer means for identifying the map entry to have its virtual address bound data compared by said second compare means, second pointer means responsive to said file means and said first pointer means for identifying a region of the map bounded by map entries previously identified by said first pointer means or by a maximum map entry, said region embracing virtual addresses including the virtual address at said input means, said first pointer means being responsive to said second pointer means and said second compare means to identify another map entry at the center of said region to further divide the region upon said second compare means detecting a non-correspondence.

18. Apparatus according to claim 17 wherein said map cache means further contains relocation data corresponding to a physical address associated with the corresponding virtual address, said apparatus further including third logic means responsive to said select means identifying a map entry associated with a region not capable of further division for adding the relocation data of said identified map entry with a portion of said virtual address to retrieve said physical address.

19. Apparatus according to claim 18 wherein said third logic means is further responsive to said second compare means detecting a correspondence between the virtual address at said input means and the virtual address bound data of a selected map entry for adding the relocation data of said selected map entry with a portion of the virtual address at said input means to retrieve said physical address.

20. Apparatus according to claim 18 further including write means responsive to said second logic means for writing into said search cache means physical address data corresponding to the physical address created by said second logic means.

21. Apparatus according to claim 18 further including second write means for writing map entries into said map cache means.

22. Apparatus according to claim 16 further including third logic means responsive to said select means identifying a map entry associated with a region not capable of further division for adding the relocation data of said identified map entry with a portion of said virtual address to retrieve said physical address.

23. Apparatus according to claim 1 wherein said second logic means comprising map entry select means for selecting a map entry from said map cache means, second compare means for comparing the virtual address bound data of the selected map entry with the virtual address at said input means, said select means being responsive to said second compare means detecting a non-correspondence to select another map entry.

24. Apparatus according to claim 23 wherein said select means selects map entries by binary search.

25. Apparatus according to claim 23 wherein said select means includes file means containing information concerning the size of the map formed by the map entries, first pointer means for identifying the map entry to have its virtual address bound data compared by said second compare means, second pointer means responsive to said file means and said first pointer means for identifying a region of the map bounded by map entries previously identified by said first pointer means or by a maximum map entry, said region embracing virtual addresses including the virtual address at said input means, said first pointer means being responsive to said second pointer means and said second compare means to identify another map entry at the center of said region to further divide the region upon said second compare means detecting a non-correspondence.

26. Apparatus according to claim 25 wherein said map cache means further contains relocation data corresponding to a physical address associated with the corresponding vertical address, said apparatus further including third logic means responsive to said select means identifying a map entry associated with a region not capable of further division for adding the relocation data of said identified map entry with a portion of said virtual address to retrieve said physical address.

27. Apparatus according to claim 26 wherein said third logic means is further responsive to said second compare means detecting a correspondence between the virtual address at said input means and the virtual address bound data of a selected map entry for adding the relocation data of said selected map entry with a portion of the virtual address at said input means to retrieve said physical address.

28. Apparatus according to claim 26 further including write means responsive to said second logic means for writing into said search cache means physical address data corresponding to the physical address created by said second logic means.

29. Apparatus according to claim 27 further including second write means for writing map entries into said map cache means.

30. Apparatus according to claim 26 further including second write means for writing map entries into said map cache means.

31. A map cache for creating a physical address of a location in a main memory of a computer corresponding to a virtual address, said map cache comprising input means for receiving said virtual address; map cache register means containing a plurality of ordered map entries each containing virtual address bound data and relocation data, each virtual address bound data bounding a segment of virtual addresses associated with physical addresses in said main memory, and each relocation data corresponding to a physical address associated with the corresponding individual virtual address; select means for selecting a map entry from said map cache register means; compare means for comparing the virtual address bound data of the selected map entry with the virtual address at said input means; retrieval means responsive to said compare means and said select means for identifying a map entry whose virtual address bound data identifies a region of virtual addresses containing the virtual address at said input and for adding a portion of said virtual address at said input to the relocation data of the identified map entry to create said physical address, said select means including file means containing information concerning the size of the map formed by the map entries, first pointer means for identifying the map entry to have its virtual address bound data compared by said compare means, second pointer means responsive to said file means and said first pointer means for identifying a region of the map bounded by map entries previously identified by said first pointer means or by a maximum map entry, said region embracing virtual addresses including the virtual address at said input means, said first pointer means being responsive to said second pointer means and said compare means to identify another map entry at the center of said region to further divide the region upon said second compare means detecting a non-correspondence.

32. Apparatus according to claim 31 wherein said select means selects map entries by binary search.

33. The method of creating a physical address of a location in a main memory of a computer corresponding to a virtual address comprising the steps of:
 (a) retrieving physical address data corresponding to said one virtual address from a search cache,
 (b) determining if the retrieved physical address data matches said one virtual address,
 (c) if a match is determined in step (b), concatenating said matched physical address data with at least a portion of said one virtual address to create said physical address,
 (d) if no match is determined in step (b), searching map entries in a map cache, said map entries comprising data relating to individual virtual addresses and corresponding physical address relocation data and identifying a region of virtual addresses,
 (e) identifying the map entry identifying the region of virtual addresses embracing said one virtual address, and
 (f) adding the physical address relocation data of the identified map entry to at least a portion of said one virtual address to create said physical address.

34. The method according to claim 32 further including, before step (e)
 (g) examining an identification code associated with the map entries to determine the validity of the searched map entries,
 (h) if the map entries are invalid, retrieving valid map entries from said main memory,
 (i) storing the retrieved map entries in said map cache, and
 (j) repeating step (d) and continuing with steps (e) and (f).

35. The method according to claim 34 further including:
 (k) following step (f), writing physical address data into said search cache corresponding to said retrieved physical address.

36. The method according to claim 35 further including:
 (l) repeating steps (a), (b) and (c), and
 (m) addressing said main memory with the physical address concatenated in step (c).

37. The method according to claim 33 further including:
 (k) following step (f), writing physical address data into said search cache corresponding to said retrieved physical address.

38. The method according to claim 37 further including:
 (l) repeating steps (a), (b) and (c), and (m) addressing said main memory with the physical address concatenated in step (c).

39. Apparatus according to claim 5 further including validation means responsive to a change in the map entries in said map cache means for invalidating all of said map cache entries.

40. Apparatus according to claim 39 wherein said validation means further invalidates the entries in said search cache.

41. Apparatus according to claim 39 wherein said map cache means additionally contains protection data, and access means responsive to the protection data for determining the validity of the selected map entry.

42. Apparatus according to claim 16 further including validation means responsive to a change in the map entries in said map cache means for invalidating all of said map cache entries.

43. Apparatus according to claim 42 wherein said validation means further invalidates the entries in said search cache.

44. Apparatus according to claim 42 wherein said map cache means additionally contains protection data, and access means responsive to the protection data for determining the validity of the selected map entry.

45. Apparatus according to claim 23 further including validation means responsive to a change in the map entries in said map cache means for invalidating all of said map cache entries.

46. Apparatus according to claim 45 wherein said map cache means additionally contains protection data, and access means responsive to the protection data for determining the validity of the selected map entry.

47. Apparatus according to claim 45 wherein said validation means further invalidates the entries in said search cache.

48. Apparatus according to claim 31 further including validation means responsive to a change in the map entries in said map cache means for invalidating all of said map cache entries.

49. Apparatus according to claim 45 wherein said map cache means additionally contains protection data, and access means responsive to the protection data for determining the validity of the selected map entry.

50. Apparatus according to claim 48 wherein said validation means further invalidates the entries in said search cache.

51. The method according to claim 34 further including invalidating the identification code upon a change in the map entries.

52. A map cache for creating a physical address of a location in a main memory of a computer corresponding to a virtual address, said map cache comprising input means for receiving said virtual address; map cache register means containing a plurality of ordered map entries each containing virtual address bound data and relocation data, each virtual address bound data bounding a segment of virtual addresses associated with physical addresses in said main memory, and each relocation data corresponding to a physical address associated with the corresponding individual virtual address; select means for selecting a map entry from said map cache register means; compare means for comparing the virtual address bound data of the selected map entry with the virtual address at said input means; retrieval means responsive to said compare means and said select means of identifying a map entry whose virtual address bound data identifies a region of virtual addresses containing the virtual address at said input and for adding a portion of said virtually address at said input to the relocation data of the identified map entry to create said physical address; and validation means responsive to a change in map entries in said map cache means for invalidating all of said map cache entries.

53. Apparatus according to claim 52 wherein said select means selects map entries by binary search.

54. Apparatus according to claim 52 wherein said validation means further invalidates the entries in said search cache.

55. Apparatus according to claim 54 wherein said map cache means additionally contains protection data, and access means responsive to the protection data for determining the validity of the selected map entry.

* * * * *

UNITED STATES PATENT AND TRADEMARK OFFICE
CERTIFICATE OF CORRECTION

PATENT NO. : 5,241,638

DATED : August 31, 1993

INVENTOR(S) : JAY E. MORK, KERRY E. OBER, DERALD A. PEDERSEN

It is certified that error appears in the above-identified patent and that said Letters Patent is hereby corrected as shown below:

Col. 12, line 39, delete "claim 32", insert --claim 33--

Col. 13, line 40, delete "claim 45", insert --claim 48--

Signed and Sealed this

Third Day of May, 1994

*Attest:*

BRUCE LEHMAN

*Attesting Officer*  Commissioner of Patents and Trademarks